United States Patent
Lekon et al.

(10) Patent No.: US 11,518,208 B2
(45) Date of Patent: Dec. 6, 2022

(54) METHOD OF OPERATING AN ADJUSTABLE ROLL STABILIZER

(71) Applicant: ZF Friedrichshafen AG, Friedrichshafen (DE)

(72) Inventors: Stefan Lekon, Stemwede (DE); Holger Gohmert, Grünkraut (DE); Benjamin Hertrich, Dettelbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 261 days.

(21) Appl. No.: 17/003,256

(22) Filed: Aug. 26, 2020

(65) Prior Publication Data

US 2021/0061050 A1 Mar. 4, 2021

(30) Foreign Application Priority Data

Sep. 3, 2019 (DE) ..................... 10 2019 213 278.2

(51) Int. Cl.
| | |
|---|---|
| *H02P 21/10* | (2016.01) |
| *H02P 21/20* | (2016.01) |
| *H02P 21/22* | (2016.01) |
| *B60G 21/055* | (2006.01) |
| *B60G 17/015* | (2006.01) |

(52) U.S. Cl.
CPC ..... *B60G 21/0555* (2013.01); *B60G 17/0157* (2013.01); *H02P 21/10* (2013.01); *H02P 21/20* (2016.02); *H02P 21/22* (2016.02); *B60G 2400/98* (2013.01)

(58) Field of Classification Search
USPC .......... 318/12, 15, 400.23, 611, 623; 701/37
See application file for complete search history.

(56) References Cited

U.S. PATENT DOCUMENTS

| | | | | |
|---|---|---|---|---|
| 2007/0290473 | A1* | 12/2007 | Buma | B60G 17/0162 280/124.106 |
| 2020/0070616 | A1* | 3/2020 | Schwarze | B60G 21/0553 |

FOREIGN PATENT DOCUMENTS

| | | | | |
|---|---|---|---|---|
| CN | 101378919 B | * | 4/2011 | ......... B60G 17/0161 |
| DE | 102004022767 A1 | * | 7/2005 | ........... H02H 7/0844 |
| DE | 10 2016 219 399 A1 | | 8/2017 | |
| KR | 20150060258 A | * | 6/2015 | |

* cited by examiner

*Primary Examiner* — Jorge L Carrasquillo
(74) *Attorney, Agent, or Firm* — Finch & Maloney PLLC

(57) ABSTRACT

A method of operating an adjustable roll stabilizer (1) of a motor vehicle. The adjustable roll stabilizer (1) has an actuator (2) which can be rotated through a system angle ($\alpha$) relative to a rotational axis (3) in order to twist two stabilizer sections (6a, 6b), connected thereto, relative to one another. The stabilizer sections (6a, 6b) are each a radial spaced away from the rotational axis (3) and each is coupled to a wheel suspension (7a, 7b, 8a, 8b, 9a, 9b). The method includes controlling the actuator with a field-orientated regulator (20) as a function of input signals which include at least a target motor torque (21), and checking the control of the actuator (2), brought about by the field-orientated regulator (20), for plausibility independently of the field-orientated regulator (20).

8 Claims, 4 Drawing Sheets

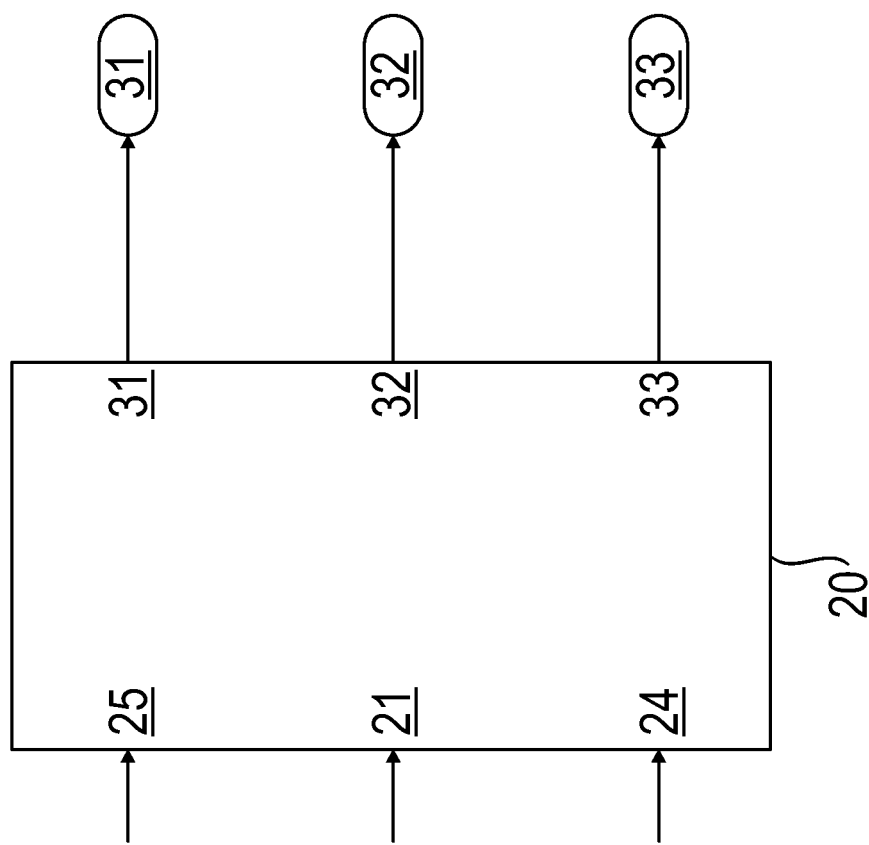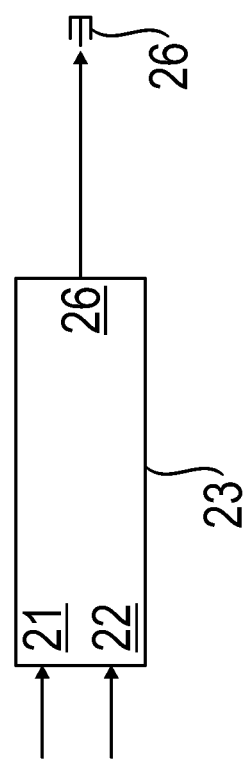

METHOD OF OPERATING AN ADJUSTABLE ROLL STABILIZER

This application claims priority from German patent application serial no. 10 2019 213 278.2 filed Sep. 3, 2019.

FIELD OF THE INVENTION

The invention relates to a method for operating an adjustable roll stabilizer for a motor vehicle and to a roll stabilizing system.

BACKGROUND OF THE INVENTION

From automotive technology, in particular chassis technology, it is known to influence the roll or rolling behavior of motor vehicles by means of so-termed roll stabilizers. In such cases the basic structure consists of an essentially C-shaped torsion bar spring which, in its central area, is mounted rotatably relative to the vehicle body and whose outer, opposite ends are, in each case, coupled to a wheel suspension by means of coupling elements termed hinged supports. By virtue of this design the roll stabilizer ensures that when driving round a curve, the body of the vehicle is deflected not only on the outside of the curve (due to the centrifugal force), but also that the wheel on the inside of the curve is somewhat lowered. Roll stabilizers improve the track-keeping of the vehicle and reduce the lateral inclination of the vehicle body (rolling), which makes driving round curves safer and more comfortable.

To further increase vehicle stability and driving comfort, it is known to make such roll stabilizers adjustable. In that case the roll stabilizer comprises an actuator and is divided into two stabilizer sections that, with the help of the actuator, can twist relative to one another about a rotational axis. By rotating the stabilizer sections relative to one another, rolling movement of the vehicle body is produced in a controlled manner or a rolling movement of the vehicle body caused by external influences is selectively counteracted. From the prior art adjustable roll stabilizers are known, whose actuator comprises an electric motor which is in driving connection with a mechanical gear system, particularly in the form of a multi-step planetary gearset, in order to produce suitable rotational speeds and torques. In this connection reference should be made, for example, to DE 10 2016 219 399 A1.

Besides the design of an adjustable roll stabilizer, its appropriate control also poses a technical challenge.

The correct control of the actuator of an adjustable roll stabilizer is based on different, variously complex preliminary considerations, from which a control strategy for the adjustable roll stabilizer and the motor vehicle equipped with it can be developed. In the context of the present invention such preliminary considerations or regulation strategies that can be developed from them will not be gone into in detail; rather, the control of the actuator itself will be considered. In accordance with a desired design, the control of the actuator, in particular that of a motor of the actuator, takes place with the help of a field-orientated regulator. Its function can be to realize a target motor torque predetermined by stored regulation instances by means of appropriate control of the actuator. For this the field-orientated regulator receives as input magnitudes, besides the target motor torque to be produced, also the current motor position and if necessary further operating parameters of the adjustable roll stabilizer and/or of the motor vehicle equipped therewith, in order on that basis to control the actuator.

Since an adjustable roll stabilizer is a chassis system of the motor vehicle which is relevant for driving safety, it is necessary to be able to check or monitor the control of the actuator motor brought about by the field-orientated regulator as regards its correctness. This is because the disadvantageous effects of incorrect control can be, for example, under-steered or over-steered driving behavior, or rolling angles of the motor vehicle that are too large.

SUMMARY OF THE INVENTION

A purpose of the present invention is to indicate a method of operating an adjustable roll stabilizer of a motor vehicle, which makes it possible promptly to recognize incorrect control of the actuator and in that way to avoid disadvantageous driving behavior of the motor vehicle equipped with the adjustable roll stabilizer. Furthermore a system for roll stabilization should be indicated, which achieves the objective.

Firstly, the objective is achieved by a method having the characteristics specified in the independent claim(s). This is a method of operating an adjustable roll stabilizer of a motor vehicle, in which the adjustable roll stabilizer comprises an actuator that can be rotated relative to a rotational axis through a system angle in order to twist two stabilizer sections connected thereto relative to one another about the rotational axis. Here, the stabilizer sections are in each case radially a distance away from the rotational axis and each is coupled to a wheel suspension. According to the invention, a field-orientated regulator controls the actuator as a function of input signals that include at least a target motor torque, and the control of the actuator bought about by the field-orientated regulator is checked for plausibility independently of the field-orientated regulator.

According to the invention, in this case it is first recognized that due to the safety relevance of an adjustable roll stabilizer for the motor vehicle in which it is fitted, incorrect control of the actuator can lead to deterioration of the driving behavior, or at least to deterioration of the driving comfort. Faulty control can lead to oversteering or understeering as well as to large roll angles of the vehicle. To avoid such disadvantages it has been deemed advantageous to check the plausibility of the field-orientated regulator of the actuator with regard to its control of the actuator. This is more a case of examining whether the control is at all plausible, i.e. not obviously incorrect, than of achieving an exact test of correctness. Thus the plausibility check is carried out with the aim of avoiding obviously incorrect control outcomes.

An advantageous embodiment of the method provides that the plausibility check is based on a comparison between the target motor torque and an actual motor torque. For this, the actual motor torque can advantageously be calculated from motor phase currents of the motor (of the actuator). It turns out that after a relatively short consideration of the motor phase currents, the actual motor torque can be calculated comparatively accurately.

As previously stated, the plausibility check is based essentially on a comparison of the target motor torque with the actual motor torque. In a preferred embodiment of the method the plausibility check is preferably carried out by defining around the target motor torque a positive tolerance band (upper tolerance) and a negative tolerance band (lower tolerance), and the actual motor torque is compared with the target motor torque so that if both conditions are fulfilled, namely that the actual motor torque is above the lower tolerance limit and below the upper tolerance limit, the target motor torque is deemed to be plausible.

According to a further advantageous embodiment of the method, the width of the tolerance band is determined from a deviation, in particular permissible at the level of the vehicle, for a torque applied by the adjustable roll stabilizer which is expediently converted to a torque related to the motor. In other words, the tolerance range extending above and below the target motor torque corresponds to the permissible torque deviation of the adjustable roll stabilizer, which is specified at the level of the vehicle.

An expedient design of the method described provides that in the comparison carried out in the context of the plausibility check between the actual motor torque and the target moor torque, a time delay is taken into account.

The target motor torque used in the context of the invention, in particular for the plausibility check, is expediently a magnitude specified by a regulator upstream from and/or superordinate to the field-orientated regulator, in particular a position-rotational speed regulator.

In the above description, the control of the actuator is always referred to in a general sense. Since in an advantageous manner the actuator of the adjustable roll stabilizer comprises an electric motor, in the context of the present invention the control of the actuator should also be understood in the narrower sense of control of a motor associated with the actuator.

The objective mentioned at the beginning is also achieved by a system for roll stabilization according to the independent claim(s). This is a roll stabilization system designed to implement a method of the type described above.

BRIEF DESCRIPTION OF THE DRAWINGS

Below, the invention is explained in greater detail with reference to a drawing, from which further advantageous design features of the invention emerge. The drawing shows:

FIG. 3: A schematic representation of a field-orientated motor regulator, FIG. 4: A schematic representation of a plausibility check of the target motor torque.

DETAILED DESCRIPTION OF THE PREFERRED EMBODIMENTS

Figure 1:
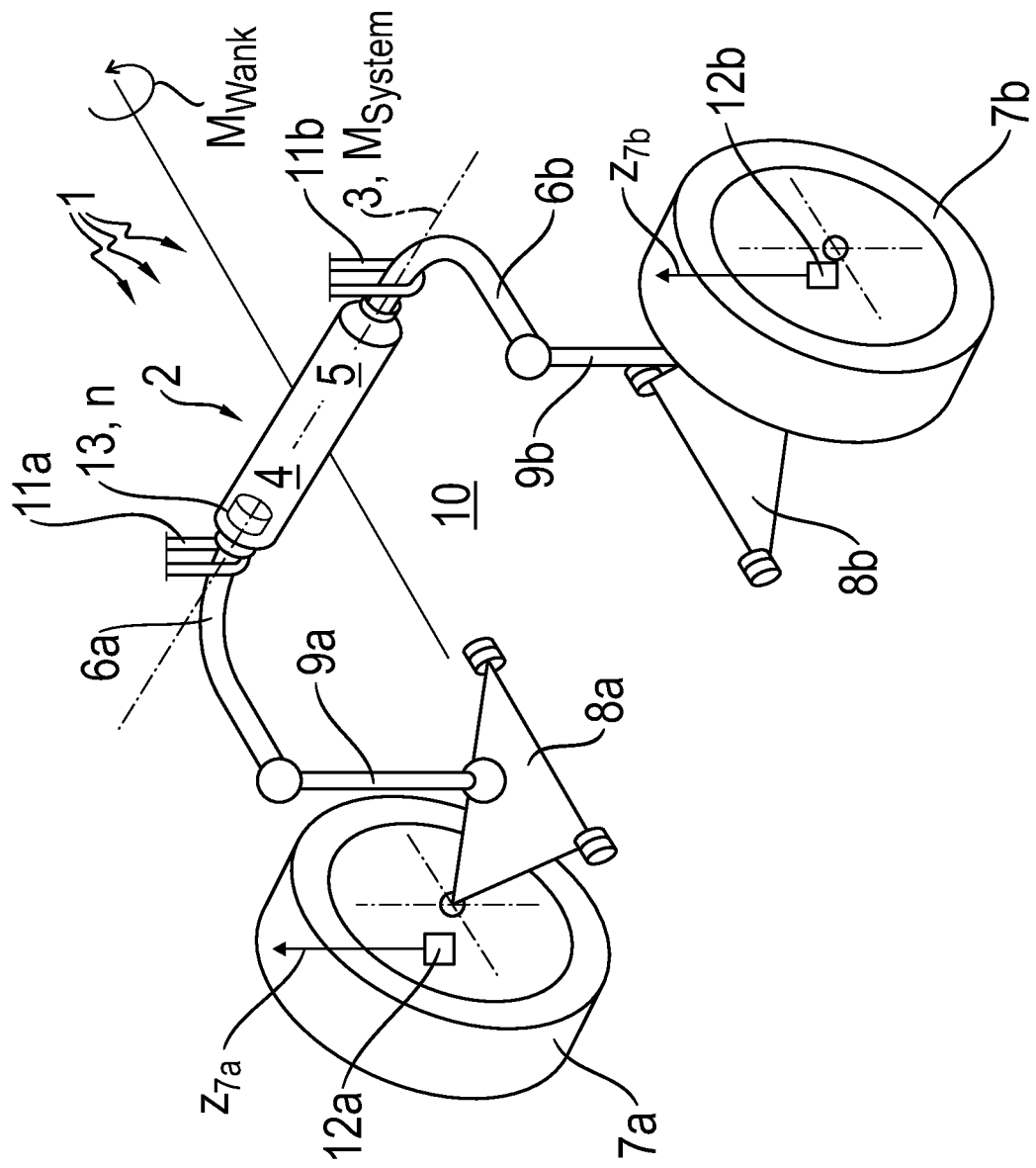
FIG. 1: An adjustable roll stabilizer for a motor vehicle, illustrated schematically.

To clarify the field of use of the invention, FIG. 1 first shows a schematic representation of an adjustable roll stabilizer 1. The adjustable roll stabilizer 1 is part of an incompletely illustrated chassis of a motor vehicle (not shown). Of the motor vehicle, the vehicle body 10 is only suggested by an index. The roll stabilizer 1 is also part of an axle of the motor vehicle, for example the front axle and/or the rear axle of the motor vehicle can be fitted with the adjustable roll stabilizer 1.

As shown in FIG. 1, a wheel 7a on the left and a wheel 7b arranged on the right, on the opposite side of the vehicle, are connected to the body 10 of the vehicle by means of control arm arrangements 8a and 8b respectively, which need no more detailed explanation. Thus, the wheel 7a and control arm arrangement 8a and the wheel 7b and control arm arrangement 8b, respectively, each form a unit and are each coupled by a hinged support 9a and 9b to a respective end of an associated stabilizer section 6a and 6b of the adjustable roll stabilizer 1. The stabilizer section 6a on the left and the stabilizer section 6b on the right are connected to one another in the middle of the vehicle by an actuator 2 shown as an essentially cylindrical body.

In a manner known as such, the adjustable roll stabilizer 1 is mounted so that it can rotate relative to the vehicle body 10 about a rotational axis 3, for which purpose a stabilizer mounting 11a on the left and a stabilizer mounting 11b on the right are provided, which mountings, as shown in FIG. 1, surround areas of the respective stabilizer sections 6a and 6b in a U-shape—illustrated in a simplified manner.

The actuator 2 represented here as a cylindrical body 2 comprises a housing (not indexed) which is essentially rotationally symmetrical relative to the rotational axis 3 and in which an electric motor 4, a multi-step planetary gearset 5 and a rotational speed sensor 13 (each indicated only by indexes) are arranged. By way of the electric motor 4 and the multi-step planetary gearset 5, the stabilizer sections 6a and 6b are in driving connection with one another. When the actuator 2 is inactive, the two stabilizer sections 6a, 6b are connected solidly to one another by way of the inactive electric motor 4 and the multi-step planetary gearset 5 in driving connection with it. By operating the electric motor 4, however, and depending on the rotational direction of the electric motor 4 about the rotational axis 3, the stabilizer sections 6a, 6b can be twisted relative to one another. During this the multi-step planetary gearset 5 produces a fixed rotational speed ratio between the drive input (electric motor 4) and the drive output (stabilizer section 6b on the right, which is coupled to the output of the gearset). In that way the adjustable roll stabilizer 1 can be adjusted in a manner known as such.

Depending on the operating condition of the adjustable roll stabilizer 1 or the vehicle equipped with it, torsion can be produced between the stabilizer sections 6a, 6b coupled to one another by the actuator 2, depending on which a torque $M_{System}$ acting about the rotational axis 3 is developed. That torque $M_{System}$ applied at the actuator 2 constitutes a system torque.

With the help of the roll stabilizer 1, a roll torque $M_{Wank}$ can be supported, which acts between the vehicle body 10 and the wheels 7a, 7b. By adjusting the roll stabilizer 1 the supportable roll torque $M_{Wank}$ can be influenced. For the regulation of the roll stabilizer 1 according to need, respective height level sensors 12a and 12b are associated with the left-hand wheel 7a and the right-hand wheel 7b, which sensors enable detection of wheel stroke movements of the wheel concerned and which emit these in the form of a height level z7a for the left-hand wheel and a height level z7b for the right-hand wheel. In addition, by way of the rotational speed sensor 13 the rotation of the electric motor 4 can be determined and this is emitted in the form of a rotational speed signal as a motor rotational speed n.

Below, regulation of the adjustable roll stabilizer 1 shown schematically in FIG. 1 is explained in greater detail with reference to the regulation strategy shown in FIG. 2. According to this, a so-termed target system torque is adopted as an input magnitude for the regulation of the adjustable roll stabilizer 1. This is a magnitude specified for the vehicle, which corresponds to the torque $M_{System}$ acting about the rotational axis 3 (see FIG. 1) that should be supported by the adjustable roll stabilizer 1 at the level of the actuator, i.e. which engages at the actuator 2—comprising the electric motor 4 and the gearset 5—with the correct rotational direction about the rotational axis 3. Thus, by virtue of the combined kinematic action of the adjustable roll stabilizer 1, the wheel suspensions 7a, 7b, 8a, 8b, 9a, 9b and the connections 11a, 11b to the vehicle body 10, the adjustable roll stabilizer 1 supports—at the vehicle level—an axle-related roll torque $M_{Wank}$ (see FIG. 1, orientated in the longitudinal direction of the vehicle).

The target system torque is converted by way of a known system rigidity into a rotational angle for the torque requirement, wherein the known system rigidity is composed of individual rigidities, in particular the rigidity of the stabilizer itself (stabilizer sections, gearset, housing, decoupling elements if present, hinged supports, stabilizer mountings and the like).

In parallel, the regulation of the adjustable roll stabilizer adopts a magnitude for the compensation of perturbations. For this, wheel movement data are detected by the height level sensors associated with the wheels, in the form of height level signals (for individual wheels) and a table of characteristic values for a decoupling angle (with previously determined vehicle-specific data) for determining a so-termed "zero-torque angle" is used, i.e. that angle which corresponds to the outermost rotational angle of the adjustable roll stabilizer, perhaps caused by an uneven road, and which would put the actuator of the adjustable roll stabilizer in a torque-free position. The two angles determined in this way, namely the rotational angle for the torque requirement and the zero-torque angle, are then added to obtain a target angle.

The target angle is then fed into a cascading position-rotation speed regulator. This comprises a position regulator which from the incoming target angle—and also having regard to a feedback signal from the motor—determines a target rotational speed, which in turn is passed to a rotational speed regulator. On the basis of the target rotational speed and a feedback from the electric motor (rotational speed), the rotational speed regulator determines a target motor torque for controlling the electric motor. The target motor torque is in turn fed into a field-orientated regulator which—again having regard to feedback signals from the electric motor—controls the electric motor 4 of the actuator 2. A motor output torque produced by the electric motor 4 is transformed—this time via a mechanical route—by way of a gear system 5 (multi-step planetary gearset) into a system torque, which acts between the stabilizer sections (see FIG. 1, indexes 6a and 6b).

Figure 2:
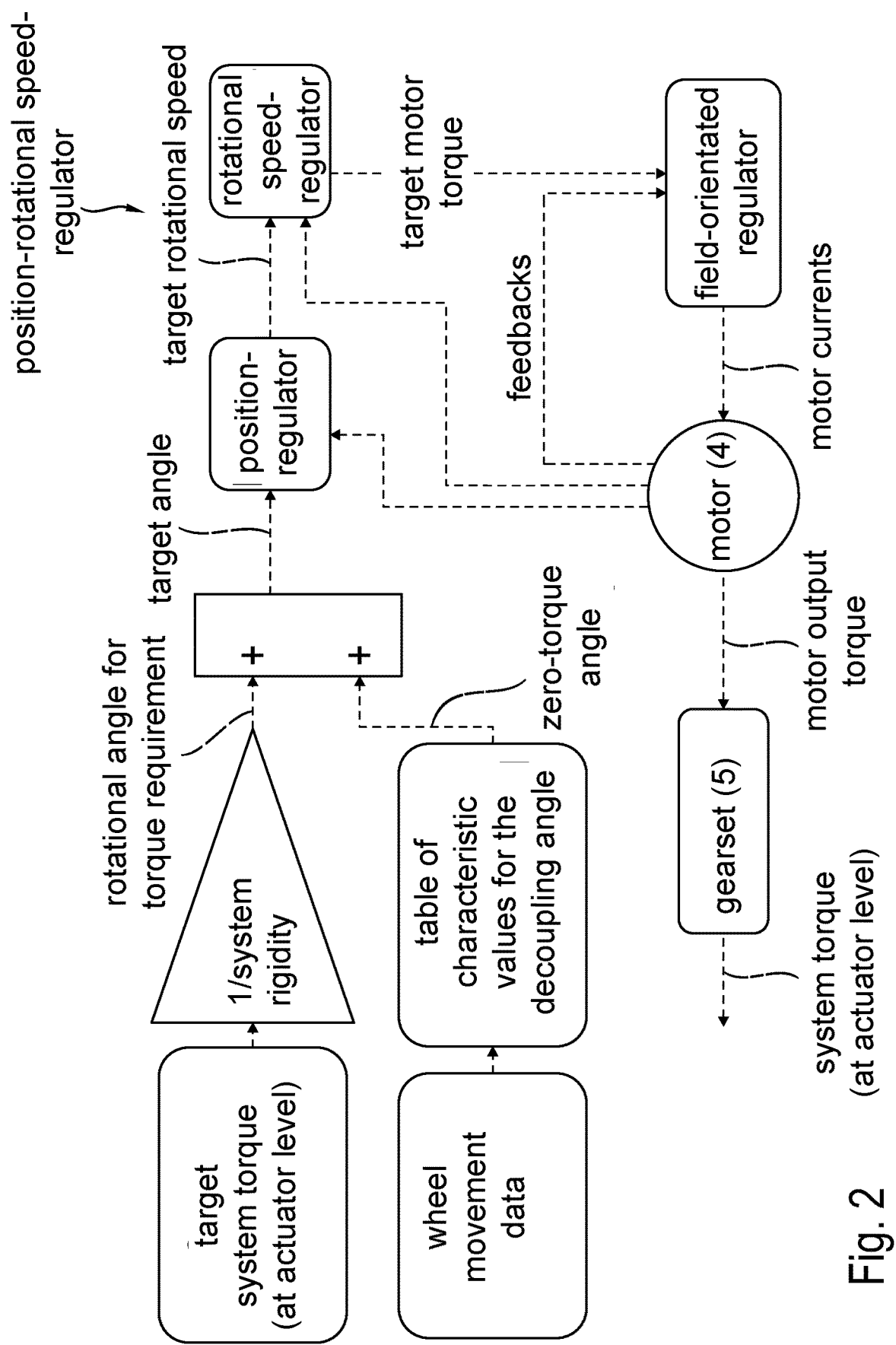
FIG. 2: A graphical representation of a regulating strategy for an adjustable roll stabilizer.

The regulation scheme shown in FIG. 2 is advantageously used with an adjustable roll stabilizer 1 of the type shown in FIG. 1. With the regulation principle described therein, an incoming system target torque is converted via the system rigidity into a target angle from which, by means of a position-rotation speed regulator, a target motor torque is determined, whereby the motor is acted upon with corresponding motor currents.

To explain the invention further, reference should now be made to FIG. 3, which is a schematic representation of a field-orientated motor regulator. The field-orientated motor regulator 20, pictured as a rectangle, is part of the regulation concept of an adjustable roll stabilizer as shown in FIG. 1, which concept has already been illustrated and explained with reference to FIG. 2.

In the field-orientated regulator 20 the input signals are a target motor torque 21, a motor position 24 (feedback from the motor 4) and various magnitudes 25. As a function of the input signals, the field-orientated motor regulator 20 emits output signals 31, 32, 33 by which the motor 4 of the actuator 2 (not shown in FIG. 3, see FIG. 2 and FIG. 1) is controlled. Preferably the motor 4 is controlled by pulse-width-modulated nominal phases. Correspondingly, the motor 4 of the actuator 2 is controlled by means of the field-orientated regulator 20 as a function of the input signals.

During operational use, for various reasons it is possible that with regard to the input signals, the field-orientated regulator 20 allows incorrect control of the actuator (motor 4). However, incorrect control of the actuator easily leads to disadvantages in relation to driving comfort and/or driving safety of the motor vehicle equipped with the adjustable roll stabilizer. Among other things, this can result in under-steering or over-steering of the vehicle or to inappropriately large roll angles of the vehicle.

Thus, in the context of the invention the control of the actuator is checked for plausibility—independently of the field-orientated regulator 20. In this connection reference should first be made to FIG. 4, which shows a schematic representation of a plausibility check of the target motor torque. According to this, monitoring 23 of the control of the field-orientated regulation ensures that, independently of the field-orientated regulator 20, the control of the actuator brought about by the field-orientated regulator 20 is checked for plausibility. The plausibility check is essentially based on a comparison of the target motor torque with the actual motor torque, for which purpose the target motor torque 21 and the actual motor torque 22 are entered as input magnitudes in the monitoring process 23. The output magnitude of the monitoring 23 is a possibly detected error 26, which is emitted if the result of the plausibility check is negative. The plausibility check itself is explained in greater detail with reference to FIG. 5.

Figure 5:
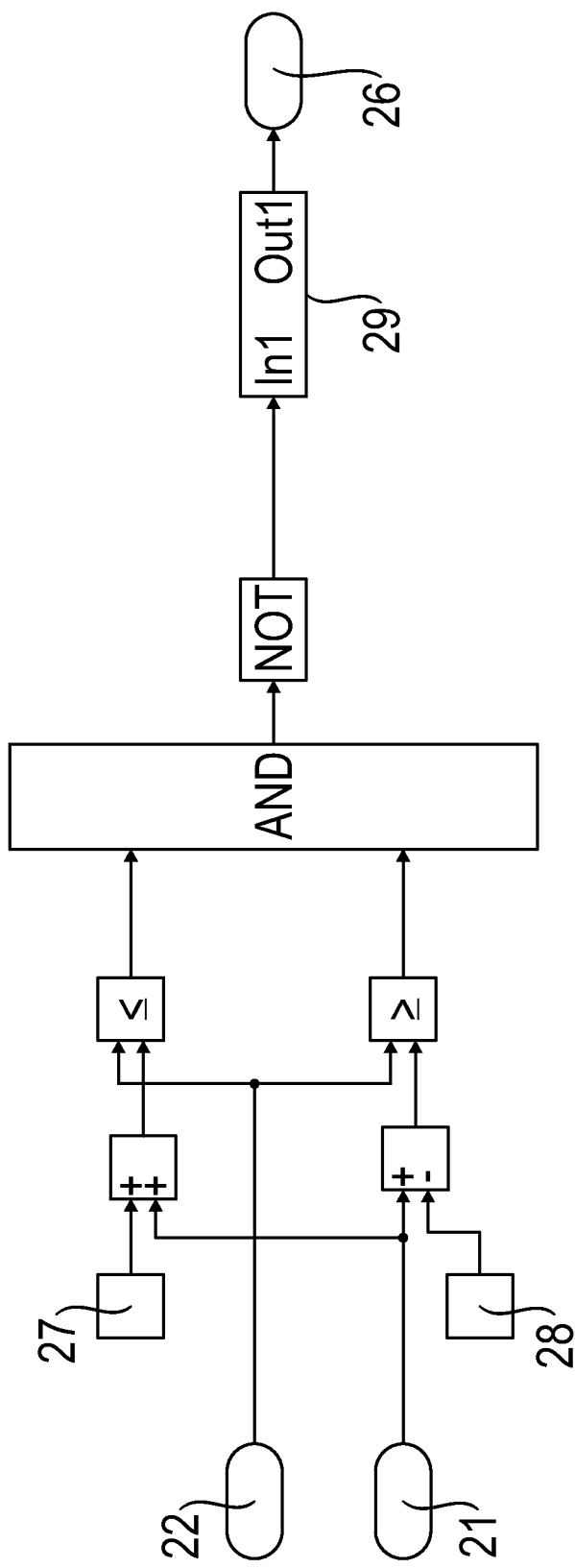
FIG. 5: A graphical representation of a plausibility checking scheme according to an embodiment of the invention.

FIG. 5 shows a graphical representation of a plausibility checking scheme used according to a preferred example embodiment of the invention. Again it can be seen, on the left of the figure, that the input magnitudes are the target motor torque 21 and the actual motor torque 22. Expediently, the latter is calculated from the motor phase currents of the motor 4 of the actuator 2 (see FIGS. 1 and 2). The target motor torque 21 is subject to a time delay ("buffered") in order to achieve time-wise synchronization between the target motor torque 21 and the actual motor torque 22. For reasons of simplicity the time-wise buffering is not represented graphically in FIG. 5.

The target motor torque 21 is checked for plausibility by defining a positive tolerance band and a negative tolerance band around the target motor torque 21, and then comparing the actual motor torque 22 with the target motor torque 21. For this, an upper tolerance in the sense of an upper threshold value is first added to the target motor torque 21, and a lower tolerance in the sense of a lower threshold value 28 is subtracted from the target motor torque 21. The actual motor torque 22 is then compared, on the one hand, against the upper tolerance limit and, on the other hand, against the lower tolerance limit, wherein the AND link shown in the middle of FIG. 5 ensures that plausibility only exists if the actual motor torque 22 is above the lower tolerance limit and below the upper tolerance limit.

A reverse link ("NOT"), combined with a subsequent debouncing, ensure that if one of the two comparison criteria is not fulfilled over a specified debouncing time, an error 26 is detected which therefore indicates the absence of plausibility in the control of the actuator by the field-orientated regulator. A lack of plausibility can be attributed to various sources of error, for example motor phases of the motor 4 may be defective, or there may be faults in the power electronics or faults in the software of the field-orientated regulator 20 itself.

INDEXES

1 Adjustable roll stabilizer
2 Actuator
3 Rotational axis
4 Electric motor
5 Multi-step planetary transmission
6a, 6b Left-hand (or right-hand) stabilizer section
7a, 7b Left-hand (or right-hand) wheel
8a, 8b Left-hand (or right-hand) control arm arrangement
9a, 9b (Left-hand (or right-hand) hinged support
10 Vehicle body
11a, 11b Left-hand (or right-hand) stabilizer mounting
12a, 12b Height level sensor of the left-hand (or right-hand) wheel
13 Rotational speed sensor
20 Field-orientated (motor) regulator
21 Target motor torque
22 Actual motor torque
23 Monitoring of the field=-orientated regulation
24 Motor position
25 Various magnitudes
26 Error
27 Upper threshold value
28 Lower threshold value
29 Time-related debouncing
31 Pulse-width-modulated nominal phase 1
32 Pulse-width-modulated nominal phase 2
33 Pulse-width-modulated nominal phase 3
z7a, z7b Height level of the left-hand (or right-hand) wheel
$M_{Wank}$ Roll torque (axis-related)
$M_{System}$ System torque
n Motor rotational speed
α System angle

The invention claimed is:

1. A method of operating an adjustable roll stabilizer of a motor vehicle, the adjustable roll stabilizer has an actuator which is rotatable through a system angle relative to a rotational axis in order to twist two stabilizer sections connected thereto relative to one another, the two stabilizer sections are each a radial distance away from the rotation axis and each is coupled to a wheel suspension, the method comprising:
   controlling the actuator with a field-orientated regulator as a function of input signals which include at least a target motor torque,
   checking the control of the actuator brought about by the field-orientated regulator for plausibility independently of the field-orientated regulator,
   accomplishing the plausibility check by defining, around the target motor torque, a tolerance band having an upper tolerance limit and an lower tolerance limit,
   comparing an actual motor torque to the target motor torque, and
   considering the target motor torque as plausible when the actual motor torque is both above the lower tolerance limit and below the upper tolerance limit.

2. The method according to claim 1, further comprising basing the plausibility check substantially on a comparison of the target motor torque with the actual motor torque.

3. The method according to claim 2, further comprising calculating the actual motor torque from motor phase currents of a motor of the actuator.

4. The method according to claim 1, further comprising determining a width of the tolerance band from a deviation, permissible at a level of the motor vehicle, of a torque applied by the adjustable roll stabilizer which is expediently converted to a torque related to a motor of the actuator.

5. The method according to claim 2, further comprising taking a time delay into account when carrying out the comparison in a context of the plausibility check between the actual motor torque and the target motor torque.

6. The method according to claim 1, further comprising specifying the target motor torque by a position-rotational speed regulator that is at least one of upstream from and superordinate relative to the field-orientated regulator.

7. The method according to claim 1, wherein the control of the actuator comprises controlling a motor associated with the actuator.

8. A roll stabilization system suitable for implementing a method of operating an adjustable roll stabilizer of a motor vehicle, the adjustable roll stabilizer comprising an actuator which is rotatable through a system angle relative to a rotational axis in order to twist two stabilizer sections connected thereto relative to one another, the two stabilizer sections are each a radial distance away from the rotational axis and each is coupled to a wheel suspension, the method including:
   controlling the actuator with a field-orientated regulator as a function of input signals which include at least a target motor torque,
   checking the control of the actuator brought about by the field-orientated regulator for plausibility independently of the field-orientated regulator,
   accomplishing the plausibility check by defining, around the target motor torque, a tolerance band having an upper tolerance limit and a lower tolerance limit,
   comparing the actual motor torque to the target motor torque, and
   considering the target motor torque as plausible when the actual motor torque is both above the lower tolerance limit and below the upper tolerance limit.

* * * * *